May 1, 1962 H. R. BYLSMA ETAL 3,031,807
LIQUID-SOLID CONTACTOR
Filed Nov. 2, 1959 2 Sheets-Sheet 1
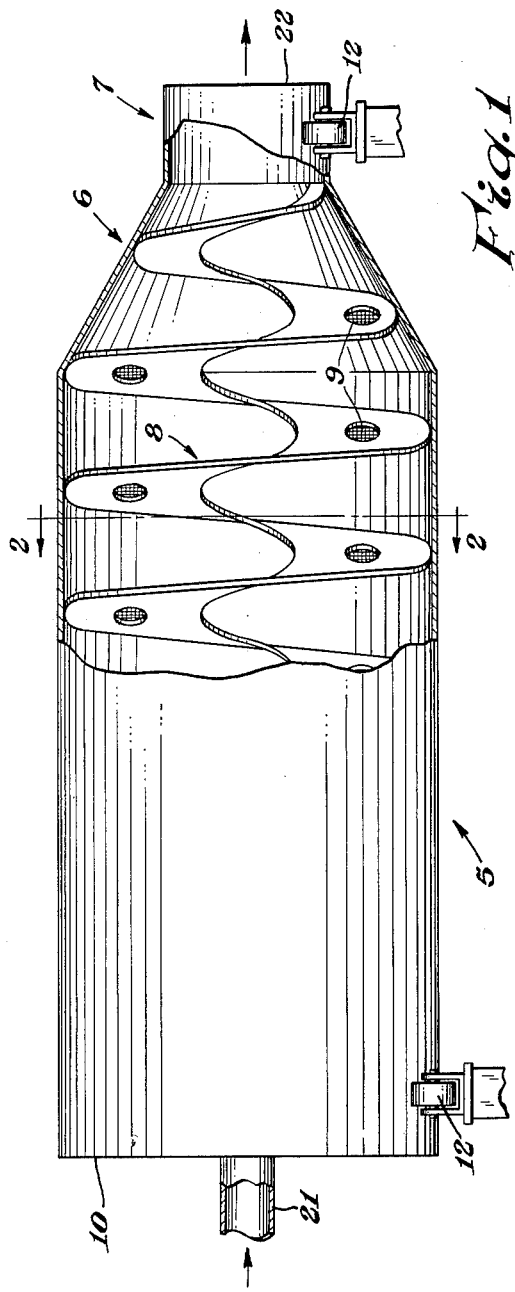
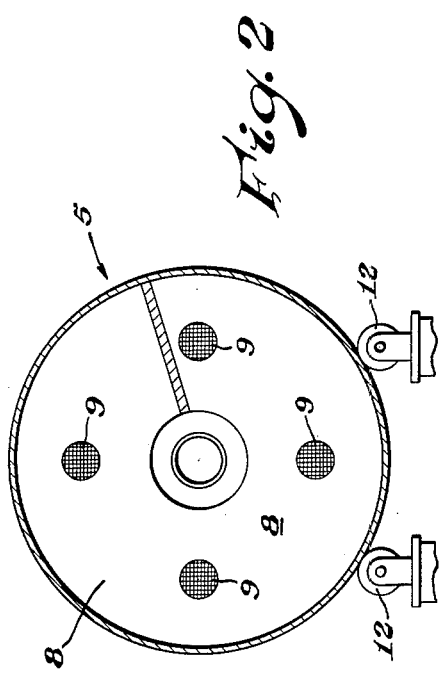
INVENTORS.
Harold R. Bylsma
Douglas S. Chisholm
BY Merlin B Davey
AGENT

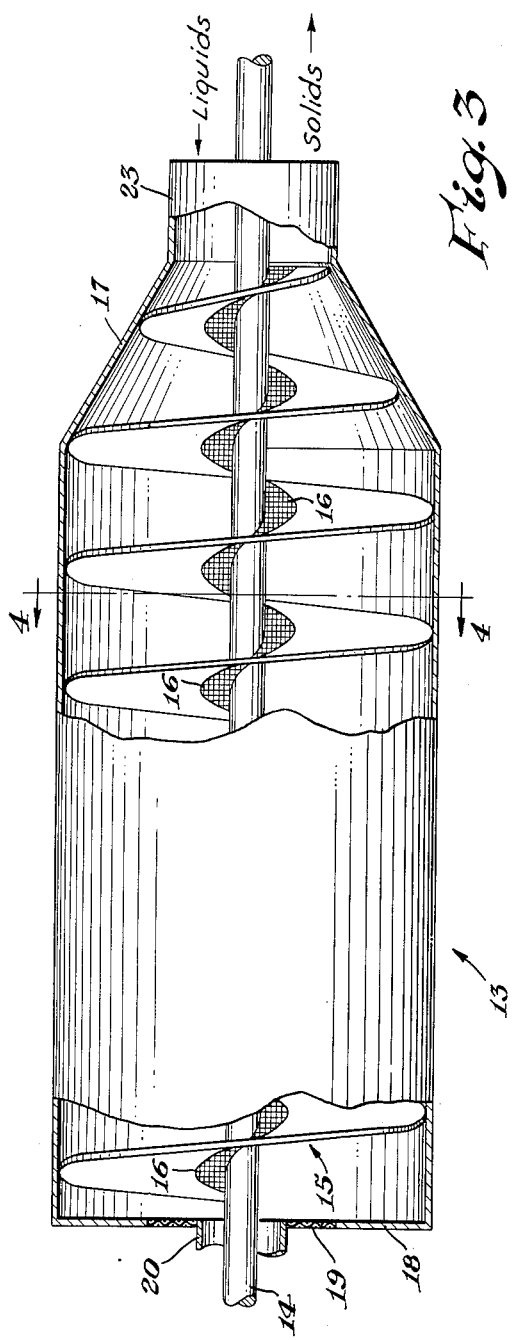
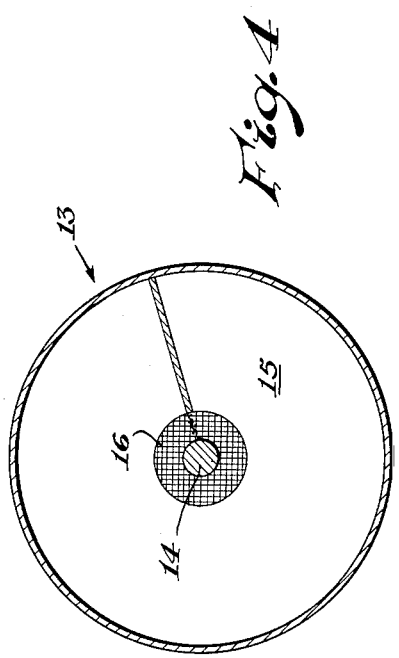
INVENTORS.
Harold R. Bylsma
Douglas S. Chisholm
BY Merlin B. Davey
AGENT

United States Patent Office 3,031,807
Patented May 1, 1962

3,031,807
LIQUID-SOLID CONTACTOR
Harold R. Bylsma and Douglas S. Chisholm, Midland, Mich., assignors to The Dow Chemical Company, Midland, Mich., a corporation of Delaware
Filed Nov. 2, 1959, Ser. No. 850,326
1 Claim. (Cl. 51—164)

This invention relates to a liquid-solid contactor and is more particularly concerned with improvements in an annealing or tempering tank, for continuously contacting particulated materials with a heated, inert liquid.

Various means have been used to forward particulate or granular materials from one place to another such as screw type conveyors for transferring particulate material from a storage bin to a packaging machine. In screw type conveyors commonly used for continuously forwarding particulate material such as molding granules of thermoplastic resins, good blending of added agents or contacting of the particulate material with inert or non-solvent liquids cannot readily be obtained. Also, in such conveyors a great deal of attrition results, and the commonly used conveyors comprising a screw or worm rotating within a barrel or trough are less suitable for contacting a particulate material with a non-solvent liquid than is desired.

It is among the objects of the present invention to provide a screw type conveyor means for forwarding and contacting particulate material with a fluid, particularly a liquid, in concurrent or counter-current flow, thereby combining the operations of good contacting and continuous forwarding of the particulate material with a minimum amount of attrition. A related object is to provide a novel screw type conveyor means in an elongated rotatable vessel for contacting particulate material with a non-solvent liquid. Another object is to provide an improved liquid-solid contactor for treating a particulate thermoplastic resin with a heated inert liquid while continuously forwarding said materials in counter-current flow with respect to one another. Other objects and advantages of the invention may appear as the description proceeds.

The foregoing and related objects have now been obtained through the provision of an open cylindrical vessel having a perforated or screened helical vane secured to its internal surface and with or without a central shaft extending therethrough, said vessel having suitable inlets or outlets at the ends of the same for the feed to, and the discharge of material from, the vessel, said helical vane being adapted to forward solid or particulate material through the vessel while permitting the flow of liquid material in a direction concurrent or counter-current to the direction of forwarding the solid material, upon rotating the vessel about its central axis.

The invention will be illustrated with reference to the accompanying drawing, wherein:

FIG. 1 is a schematic sketch partly in section of a side view of a rotatable horizontal vessel equipped with the new perforated or screened helical vane.

FIG. 2 is a cross-section of the vessel taken along the line 2—2 of FIG. 1.

FIG. 3 is a longitudinal section of a modified horizontal vessel equipped with the new perforated or screened helical vane and secured to a central axle or shaft.

FIG. 4 is a cross-section of the vessel of FIG. 3 taken along the line 4—4 of FIG. 3.

In FIG. 1 of the drawing, an open cylindrical vessel 5 having one end in the form of a truncated cone 6, joining a shortened cylindrical section 7 of smaller diameter than the main section of vessel 5, is fitted with a helical vane 8, having perforations or screened passageways 9 therein; approximately midway between the inner and outer peripheries of said vane. The helical vane 8 is secured to the inner well of vessel 5 by any suitable means such as by bolts or preferably by being welded to said wall and constitutes a continuous screw type conveyor means for forwarding solid material when the vessel 5 is rotated about its axis. The screened openings or perforations 9 in the vane 8 are sufficient in number and in size to retain solid particulate material thereon and to permit the flow of liquid therethrough. The end 10 of vessel 5 is provided with an inlet 21 for feeding the solid material and liquid into the vessel for operation under conditions of concurrent treatment. If counter-current operation is desired appropriate screened openings may be placed in end 10 and the treating liquid fed into the contactor through section 7. The end 6 joining the shortened section 7 of vessel 5, together with end 10 having a central inlet 21, permits the retaining of a reservoir of liquid within the vessel 5. The vessel 5 is rotated by any usual means, such as by means of gears or a sprocket and chain, turned by an electric motor (not shown), thus forwarding the solid material from the inlet 21 to the outlet 22 at the opposite end. Outlet 22 may also be used as an inlet for the treating liquid. The vessel 5 may be supported on rotatable wheels 12 or by other usual means.

In FIG. 2 of the drawing the cross-section shows the screened openings 9 as being located approximately midway between the inner or outer peripheries of vane 8 and is self-explanatory, it being apparent that other modes and locations of the screened openings or perforations can be used.

FIG. 3 of the drawing shows a cylindrical vessel 13 supported on a central shaft 14 and fitted with a helical vane 15 having screened openings 16 adjacent to shaft 14. One end of vessel 13 is in the form of a truncated cone 17 while the other is fitted with a cover 18 having a liquid outlet 19 and a solid inlet 20 therein. In this vessel the contacting liquid is fed into section 23 and the treated solids are removed from section 23. The vessel 13 is rotated by turning shaft 14 in the conventional manner such as by means of suitable gears and an electric motor (not shown).

FIG. 4 of the drawing shows a cross-section of vessel 13 and is self-explanatory.

The essential feature of the invention is the perforated or screened helical vanes 8 and 15 in combination with the vessels 5 and 13, and secured to the inner wall of said vessel which provides a screw type forwarding action against particulate solid material without undue attrition while at the same time permitting the flow of liquid through said vessels in a direction concurrent or counter-current to the direction of forwarding of the solid particulate material when the vessels are turned or rotated about their axis. The truncated ends 6 and 17 of the vessels 5 and 13 shown in the drawing, together with the ends 10 and 18 having outlets and/or inlets 21 and 19 therein, provide a reservoir of liquid within said horizontal vessel for suspending the solid particle therein and results in improved contacting of the particles with the liquid and reduces the tendency toward attrition. It will be apparent to those skilled in the art that the vessels can be operated horizontally or in an inclined position and that various modifications can be made without detracting from the essential feature of the invention comprising a perforated or screened helical vane in fixed attachment with inner walls of a cylindrical vessel adapted to provide a screw type forwarding action upon particulate or granular solid material while at the same time permitting flow of a liquid in contact with said solid material in a direction concurrent or counter-current to the direction of forwarding of the solid material when the vessel is rotated about its axis.

The invention is useful for the contacting, treating or washing of various solid materials in particulate or granular form with liquids, and is particularly useful for treating granules of thermoplastic polymers with a heated inert or nonsolvent liquid to anneal the granular polymer. Heating of the solid and liquid materials can be carried out in usual ways such as by feeding the solid particles and the heated liquid into opposite ends of the vessel and bringing them into contact with one another as they are forwarded in counter-current flow through said vessel, or by heating the vessel with hot water, steam or oil circulated through a jacket or jackets provided for such purpose, but not shown in the drawing.

In a representative operation polystyrene foaming-in-place beads were fed into the tank at a rate of 86 pounds per hour. The tank was rotated at 1 revolution per minute while water at 74° C. was fed into the system concurrently. The outlet temperature of the water was 66° C. and the average hold up of the granules was 11¼ minutes. To obtain the same degree of heat treatment or temper, as evidenced by a cell size in prefoamed beads of 0.2 or less millimeter, it is necessary to treat the beads for 20 minutes at 70° C. in the batch process.

Other runs were made varying the feed rate from 71.5 to 428 pounds per hour and the rotational speed from 0.5 to 1.0 revolution per minute.

Similar results were obtained in all cases.

Various modifications may be made in the present invention without departing from the spirit or scope thereof, and it is understood that we limit ourselves only as defined in the appended claim.

We claim:

A liquid-solid contactor for continuously treating a solid particulate material with a liquid, comprising the combination of a cylindrical vessel rotatable about its longitudinal axis, a helical vane in fixed attachment to the inner walls of the vessel for positively advancing the solid material being processed and preventing the escape of floating particles, said vane having a plurality of passageways therein for the flow of liquid through said vane and the particulate material; and wherein one end of the vessel is in the form of a truncated cone for discharge of the solid particulate material being processed and the other end of the vessel is in the form of a cover plate having a screened annulus about a central inlet for feed of solid particulate material to, and the flow of liquid from said vessel.

References Cited in the file of this patent

UNITED STATES PATENTS

| | | |
|---|---|---|
| 494,463 | Cox | Mar. 28, 1893 |
| 731,092 | Baker | June 16, 1903 |
| 1,168,799 | Grier | Jan. 18, 1916 |
| 2,158,076 | Lupo | May 16, 1939 |
| 2,427,388 | Curran | Sept. 16, 1947 |
| 2,505,371 | Teepe | Apr. 25, 1950 |
| 2,600,367 | Stirn et al. | June 10, 1952 |
| 2,933,861 | Bintzler | Apr. 26, 1960 |

FOREIGN PATENTS

| | | |
|---|---|---|
| 715,805 | Germany | Jan. 7, 1942 |